United States Patent [19]

Iwamoto

[11] Patent Number: 4,870,544
[45] Date of Patent: Sep. 26, 1989

[54] OPTICAL-AXIS ADJUSTING APPARATUS FOR AUTOMOTIVE LIGHTS

[75] Inventor: Miyoshi Iwamoto, Odawara, Japan

[73] Assignee: Ichikoh Industries Limited, Tokyo, Japan

[21] Appl. No.: 161,050

[22] Filed: Feb. 26, 1988

[30] Foreign Application Priority Data

Feb. 26, 1987 [JP] Japan .............................. 62-26482[U]

[51] Int. Cl.$^4$ .............................................. B60Q 1/06
[52] U.S. Cl. ...................................... 362/66; 362/289; 362/428
[58] Field of Search ...................... 362/61, 66, 80, 285, 362/289, 418, 419, 427, 428

[56] References Cited

U.S. PATENT DOCUMENTS

| 3,823,314 | 7/1974 | Germany | 240/41.6 |
|---|---|---|---|
| 4,271,456 | 6/1981 | Dick | 362/66 |
| 4,524,407 | 6/1985 | Iguza | 362/66 |
| 4,621,307 | 11/1986 | Weber | 362/80 |
| 4,689,725 | 8/1987 | Saijo et al. | 362/289 |
| 4,712,164 | 12/1987 | McMahan et al. | 362/66 |
| 4,722,029 | 1/1988 | Ahle | 362/80 |
| 4,761,717 | 8/1988 | McMahan et al. | 362/66 |
| 4,794,495 | 12/1988 | McMahan et al. | 362/66 |

FOREIGN PATENT DOCUMENTS

| 3445703 | 6/1985 | Fed. Rep. of Germany | 362/66 |
|---|---|---|---|
| 3437198 | 8/1985 | Fed. Rep. of Germany | 362/66 |

Primary Examiner—Ira S. Lazarus
Assistant Examiner—Richard R. Cole
Attorney, Agent, or Firm—Foley & Lardner, Schwartz, Jeffery, Schwaab, Mack, Blumenthal & Evans

[57] ABSTRACT

In an optical-axis adjusting apparatus for use with automotive lights, an adjusting member is provided to orientate the lamp unit by tilting the latter about the horizontal and vertical axes. The adjusting member includes an adjusting threaded rod screwed in an internally threaded member fixed to the body of motor vehicle and which can be moved forwardly and reversely. The shank of the adjusting threaded rod has formed a ball-shaped portion at a part thereof. The ball portion is received in spherical concavities of the holder and rotatably supported in the holder. The holder is elastically fitted in a holder support member from a direction substantially perpendicular to the forwardly and reversely moving direction of the threaded rod and prevented from coming off the holder by means of stoppers. Therefore, the adjusting member can be easily and securely installed to the lamp unit and permits a smooth optical-axis adjustment.

8 Claims, 6 Drawing Sheets

OPTICAL-AXIS ADJUSTING APPARATUS FOR AUTOMOTIVE LIGHTS

BACKGROUND OF THE INVENTION (a) Field of the Invention

The present invention relates to an optical-axis adjusting apparatus for use with automotive lights such as headlight, fog light, etc., and more particularly to an optical-axis adjusting apparatus easily assemblable to and securely retainable by such lamp unit.

(b) Prior Art Statement

The optical-axis adjusting apparatus for use with automotive lights generally include two types: In one of these types, the entire lamp unit including the reflector is rotatable about the horizontal and vertical axes to adjust the optical axis, namely, to orientate the light beam from the lamp unit, and in the other type, the reflector inside the lamp unit is freely rotatable about the horizontal and vertical axes for the same purpose. Particularly, in the optical-axis adjusting apparatus of the former type, the lamp unit as a whole is pivotably supported by means of a pivot assembly to a support member for attachment to a motor vehicle and threaded shanks in a pair each having one end thereof pivotably fitted in the back of the lamp unit and screwed in an internally threaded member fixed to the support member are provided to tilt the lamp unit about the horizontal and vertical axes, respectively, thereof, thereby adjusting the position of the lamp unit. For example, as disclosed in the U.S. Pat. No. 3,823,314 for a lamp assembly, each of the threaded shanks has formed at the end thereof a ball which is received in a part-spherical recess formed in a part of a coupling piece engaged in a flange fixed to the support member, and each of the threaded shanks is screw-threaded in a nut member secured to the support member. Thus, as any one of the threaded shanks is moved forwardly or reversely, the lamp unit is tilted about the horizontal or vertical axis. These coupling pieces are made of a synthetic resin, and each consists of a hollow body portion and a rectangular head portion interconnected by means of a cylindrical neck portion. The neck portion of the coupling is inserted in a slot formed in a part of the flange, and the hollow body and rectangular head engage with the respective surfaces of the flange with the slotted portion of the flange being between the hollow head portion and rectangular head portion which oppose each other, so that the coupling piece is prevented from moving in relation to the flange in a direction perpendicular to the flange. Also, a pair of opposite edges of the head portion of the coupling piece engage with the opposing side walls, namely, upstanding walls, of the flange so that the coupling piece is prevented from rotating in relation to the flange.

In such conventional lamp assembly, since the neck portion of the coupling piece has a diameter larger than the wide of the narrowed region of the slot and the coupling piece and flange are elastic, the neck portion is to be forcibly pressed beyond the narrowed region of the slot for movement to the final position.

With such a construction of the conventional lamp assembly, the diameter of the neck portion of the coupling piece must be larger than the width of the narrowed region of the slot within a certain range and it is difficult to implement such a geometry maintaining the certain range in consideration. If the dimensional relation between the diameter of the neck portion and the width of the narrowed region of the slot is not proper, a large load will apply to the projections of the flange which are in contact with the neck portion of the coupling piece, resulting in a deformation of the projection, or on the contrary, in a weakened coupling of the coupling piece with the flange. So, the threaded shanks can not withstand the repeated forward and reverse movement.

SUMMARY OF THE INVENTION

The present invention seeks to provide an optical-axis adjusting apparatus very easily assemblable to, securely retainable by a lamp unit and capable of adjusting the optical axes positively and smoothly.

The above-mentioned object of the present invention is attained by providing an optical-axis adjusting apparatus including means of adjusting the position of the lamp unit by tilting the lamp unit around the horizontal and vertical axes, respectively, in relation to a support member fixed to the body of a motor vehicle, each of said adjusting means comprising, according to the present invention, an internally threaded member formed in the support member, a threaded rod having a thread portion which is screwed in said internally threaded member, a shank and a ball-shaped portion formed at a part of the shank, a synthetic resin-made holder having a concave spherical surface which receives the ball-shaped end of said threaded rod, and a holder support member provided on said said lamp unit and which fixedly supports said holder; said holder adapted to be fitted on said holder support member from a direction perpendicular to the threaded rod, and said holder having formed on the outer surface thereof a pair of recesses slanted in said fitting direction and said holder support member comprising a pair of guide members having slated engagement surfaces corresponding to said recesses, respectively, and a stopper for preventing said holder from being displaced in a direction opposite to said fitting direction.

These and other objects and advantages of the present invention will be better understood from the ensuing description made, by way of example, of the embodiments of the present invention with reference to the drawings.

DETAILED DESCRIPTION OF THE PREFERRED EMBODIMENTS

Figure 1:
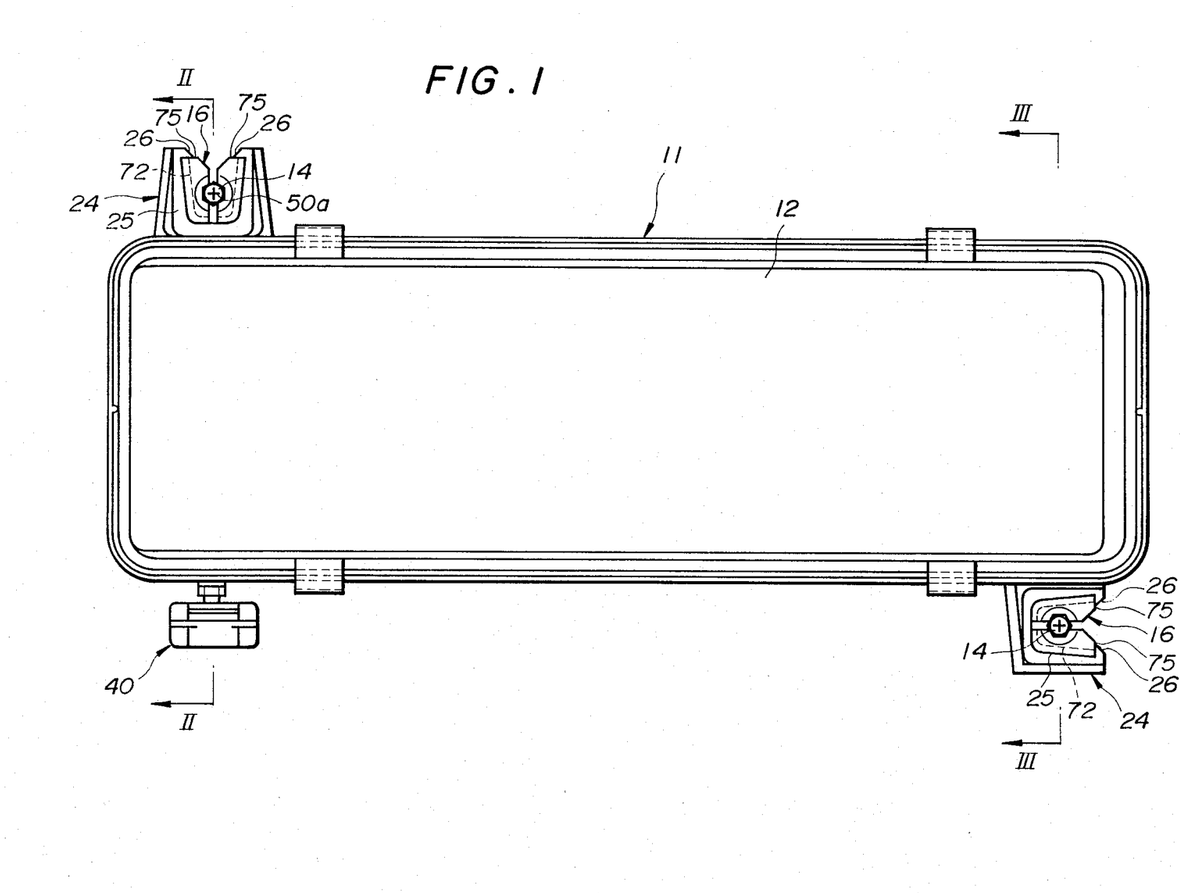
FIG. 1 is a front view of a head light assembly provided with the optical-axis adjusting apparatus according to the present invention.
Figure 2:
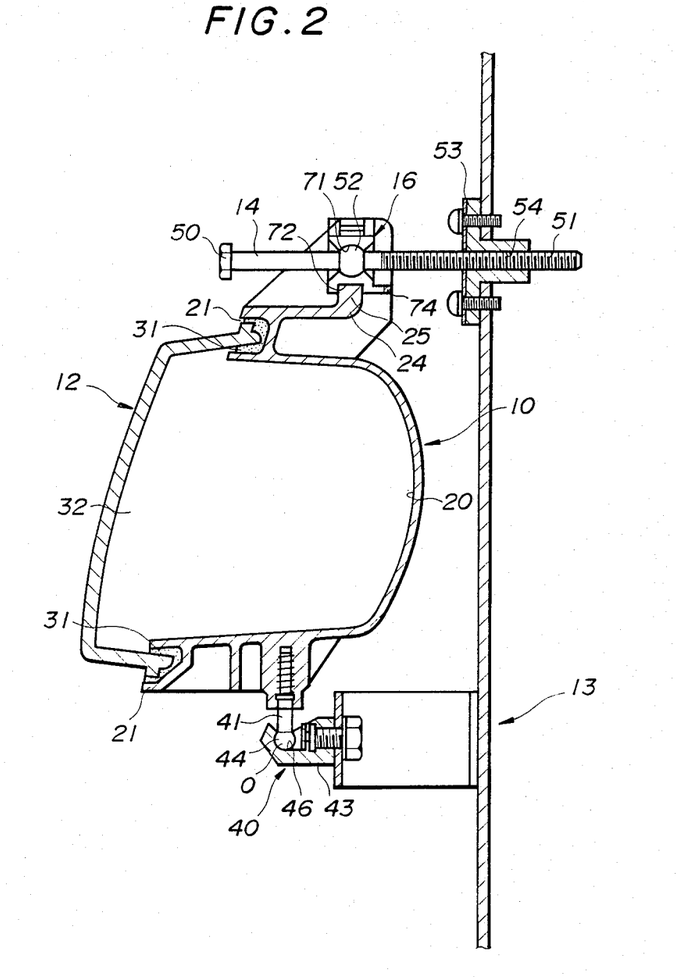
FIG. 2 is a sectional view taken along the line II—II in FIG. 1.
Figure 3:
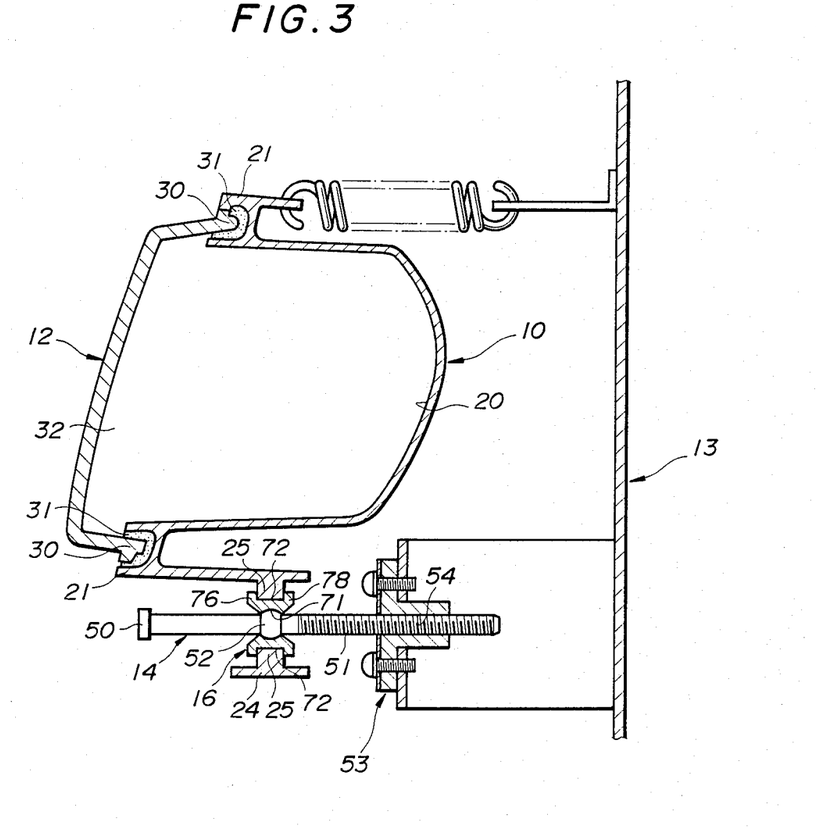
FIG. 3 is also a sectional view taken along the line III—III of FIG. 1.

Referring now to FIG. 1 generally showing the headlight unit to which an embodiment of the present invention is applied, a reflector 10 of the headlight unit is formed integrally with a housing 11. The housing 11 in this embodiment is designed horizontally long and has therein two reflective surfaces 20 each shaped as a paraboloid of revolution. The housing 11 has a concavity or socket 21 formed along the circumferential edge of the front opening thereof. A front lens 12 has a circumferential edge fitted in the concavity 21 and fixed there by an adhesive 31. There is disposed a lamp bulb (not shown) in a lamp house 32 defined by the reflector 10 and front lens 21. In this embodiment, two lamp bulbs are disposed in the lamp house correspondingly to the above-mentioned two reflective surfaces 20 and the filament of each lamp bulb is positioned near the focus of the corresponding reflective surface. The headlight unit as a whole of the above-mentioned construction is supported pivotably by means of a pivot assembly 40 to the body of a motor vehicle indicated at the reference numeral 13. The pivot assembly 40 comprises a shaft 41 disposed near one of the corners in pair located diagonally of the headlight unit as shown in FIG. 1, fixed at the bottom of the headlight unit as shown in FIG. 2 and provided with a ball portion 44 at the free end thereof, and a retainer 43 fixed to the body of the motor vehicle and provided at the free end thereof with a concavity or socket 46 which receives the ball portion 44. Thus the headlight unit is rotatably and tiltably, namely, pivotably, supported about the center O of the ball portion 44 in relation to the motor-vehicle body 13.

Figure 4:
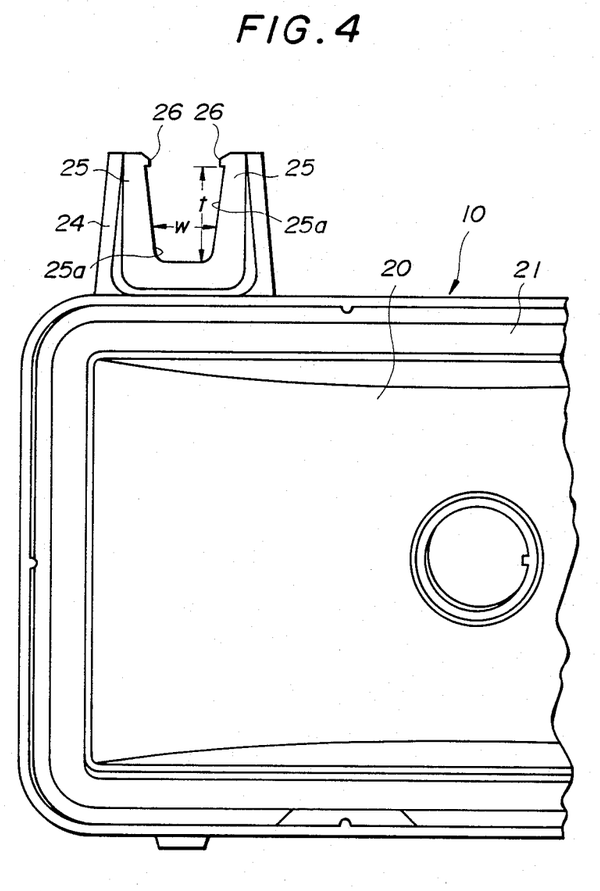
FIG. 4 is a front view, partially enlarged in scale, of the lamp unit, with the front lens removed, showing the dimensions of the holder support member in which the holder is engaged.
Figure 5:
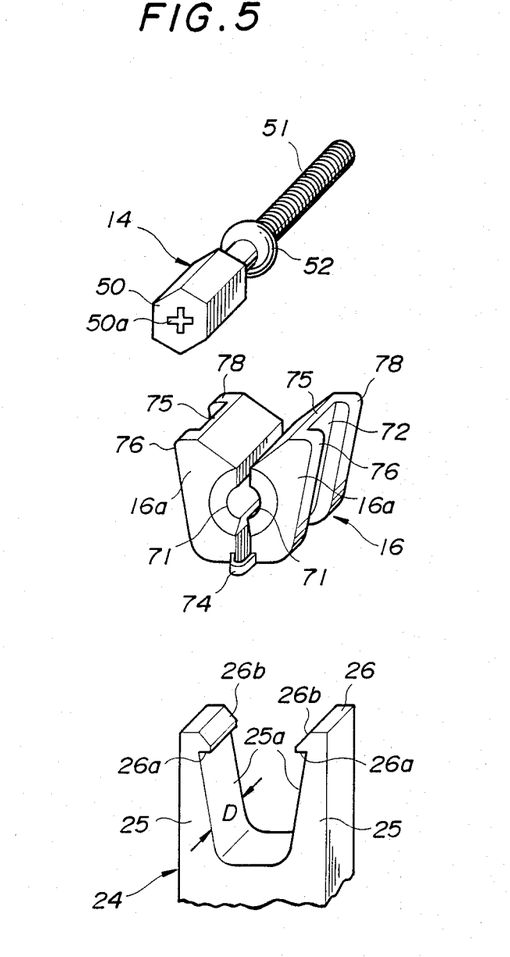
FIG. 5 is an exploded perspective view showing the engagement of the adjusting threaded rod, holder and holder support member.

Disposed near the opposing corners, respectively, in pair located in the other diagonal of the headlight unit are holder support members 24 formed integrally with the headlight unit and to which holders 16 supporting threaded rods 14 in pair for adjusting the horizontal position of the headlight unit. As shown in FIG. 1, the holder support member 24 provided at the upper left end of the headlight unit has a pair of guide members 25 extending in a direction perpendicular to the reflection axis of the reflector 10. Each of these guide members 25 has a generally U-shaped section as shown in FIGS. 4 and 5, the top of the section being open while the distance W at the bottom between the guide members which is smaller than that at the top, thus the opposing inner walls 25a of the guide member 25 each forming a taper surface. As shown in FIG. 1, the guide member 25 of the holder support member 24 disposed at the lower right end of the headlight unit is open at the right side while the the distance W at the left end of the guide member 25 between the guide members is smaller than that at the right side, thus the opposing inner walls 25a each forming a taper surface. provided at the opposing open edges, respectively, of these guide members 25 in pair are stoppers 26 extending in a direction parallel to the reflection axis of the reflector 10 and which protrude inwardly.

Figure 6:
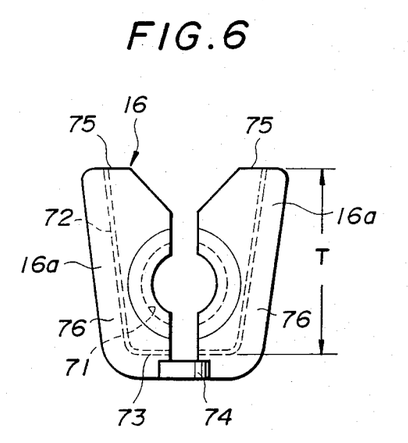
FIG. 6 is a front view, enlarged in scale, of the holder.
Figure 7:
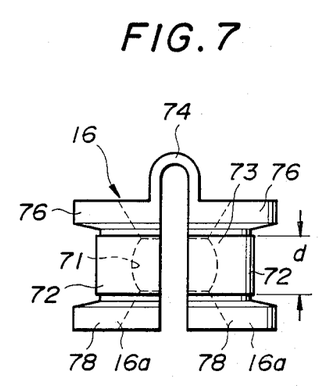
FIG. 7 is a bottom view, enlarged in scale, of the holder.
Figure 8:
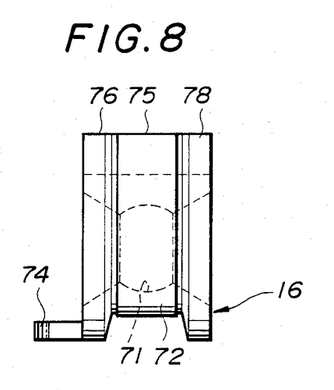
FIG. 8 is a right side elevation, enlarged in scale, of the holder.

Each holder 16 retaining each threaded rod 14 is made of an elastic synthetic resin such as polyamide resin (PA) or plyacetal resin (POM). As shown in detail in FIGS. 6 to 8, the holder 16 consists of two holder elements 16a. Formed at the center of each of he opposing inner walls of the holder elements 16a is a hemispheric concavity 71 in which a ball portion 51 formed at a part of the threaded rod 14 is received. The holder elements 16a are joined together by means of a U-shaped coupling member 74. Each of the holder element 16a has provided along the outer lateral circumference thereof an engagement recess for engagement with the guide member 25 of the holder support member 24. These recesses include a slanted recess 72 corresponding to the slanted surface 25a of the guide member 25 and a recess 73 contiguous as curved to the slanted recess and formed generally flat correspondingly to the bottom face of the guide member 25. Flanges 76 and 78 formed longitudinally of the above-mentioned recesses, respectively, along the outer lateral circumferences, respectively, of each element 16a and outside these recesses are designed so as to engage on the front and back of the guide member 25 of the holder support member 24. The upper end 75 of the holder 16 extending in a direction parallel to the reflection axis is designed for engagement with the bottom 26a of the stopper 26 formed on the holder support member 24.

The angle formed by the opposing slanted surfaces 25a of the guide member 25 of the aforementioned holder support member 24 is nearly equal to or somewhat smaller than the angle formed by the slanted recesses 72 in each holder element 16a, and the distance t from the bottom of the guide member 25 to the bottom of the stopper 26 is nearly equal to or a little shorter than the distance T from the flat recess 73 of the holder to the top engaged on the stopper 26. Furthermore, the width D of the slanted surface 25a of the guide member 25 is generally equal to the width d of the recesses 72 and 73 of each holder element 16.

The threaded rod 14 supported in the above-mentioned holder 16 comprises a head 50 having a cross recess 50a, thread portion 51 and a ball-shaped portion 52 formed integrally with the threaded portion 51. The reference numeral 53 indicates a screw mount for fixation to the body of the motor vehicle and which supports the threaded rod 14 in such a manner that the threaded rod 14 can move in a direction parallel to the reflection axis while being rotated. This screw mount 53 has an internal thread in which the thread portion 51 is screwed. As shown in FIG. 5, the threaded rod 14 is installable by fitting the ball-shaped portion 52 thereof into the concavity or socket formed by the hemispheric concavities 71 of the holder elements 16a in pair. At this time, the holder elements 16a of the holder 16 are opened outwardly away from each other taking the coupling member 74 as center. Thereafter, the hemispheric concavities 71 are rendered to their initial positions under the effect of elastic stability to fit the ball-shaped portion 52. In this condition, the head 50 having the cross recess 50a is positioned outside the holder 16 and adjustable from the front of the headlight unit. The holder 16 in which the threaded rod 14 is fitted is force-fitted into the holder support member 24 with the recesses 72 directed toward the slanted surfaces 25a, respectively, of the guide members 25, so that the flat recess 73 of the holder 16 fits the bottom face of the guide member 25 while the recesses 72 fit the slanted surfaces 25a, respectively, of the guide surfaces 25a When the holder 16 is force-fitted into the holder support member 24, the flat recesses 73 of the holder 16 first get into contact with the slanted surfaces 26a formed on the stopper 26, and as the force-fit goes on, the slanted recesses 73 go down while being in contact with the slanted surfaces 26b formed on the stopper 26. While the holder 16 is going down, the holder elements 16a are closed away from each other by means of the stopper 26. Thereafter, when the flat recesses 73 of the holder 16 touch the bottom face of the guide member 25, the holder elements 16a are opened away from each other under the effect of elastic stability so that the slated recesses 73 engage on the slanted surfaces 25a, respectively, of the guide members 25 and the bottoms 26a of the stoppers 26 engage on the tops 75, respectively, of the holder 16. In this condition, the holder is locked by the stopper 26 against coming off in a direction opposite to the fitting direction, and the opposing inner walls with the recesses 76 and 78 placed therebetween engage on the front and back, respectively, of the guide member 25 of the holder support member 24, so that the holder 16 cannot be displaced in a direction parallel to the reflection axis.

In the embodiment having been described in the foregoing, the holder consists of two holder elements 16a. However, the holder 16 according to the present invention is not limited only to such a split structure, but it is of course apparent to those skilled in the art that the holder 16 may have any structure in which it has provided nearly at the center thereof a spherical concave surface or socket to receive the ball portion 52 of the threaded rod 14 and also slanted recesses 72 and 73 along the outer circumferences of the surfaces so that when the holder 16 holding the threaded rod 14 16 is fitted into the holder support member 24, it is elastically deformed as pressed by means of a pair of stoppers 26 formed at the respective free ends of the guide members 25 in pair, which work in opposite directions to each other, the recesses 72 and 73 finally engage on the slanted surfaces 25a, respectively, of the guide members 25 and the bottoms 26a of the stopper 26 engage on the tops 75, respectively, of the holder 16.

As having been described and illustrated in the foregoing, in the optical-axis adjusting apparatus according to the present invention, the one ends of the treaded shafts 14 in pair for adjusting the tilting of the headlight unit about the horizontal and vertical axes, respectively, are supported to the screw mounts installed to the body of motor vehicle in such a manner that the rods can be moved forwardly and reversely in a direction parallel to the reflection axis, the ball portion formed at the shank of the threaded rod is received in the spherical concavity of the holder fitted in the holder support member formed on the headlight unit, the holder itself is fitted into the holder support member from a direction perpendicular to the reflection axis and prevented from being displaced in a direction parallel to the reflection axis as well as from coming off in a direction opposite to the fitting direction because it is retained by the stopper of the holder support member. Hence, the optical-axis adjusting apparatus according to the present invention is extremely easy to be assembled to and securely retained by the headlight unit, and permits to adjust the optical axis accurately and smoothly.

What is claimed is:

1. An optical-axis adjusting apparatus for use with a lamp unit including means for adjusting the position of the lamp unit by tilting the lamp unit around the horizontal and vertical axes, respectively, in relation to a support member fixed to the body of a motor vehicle, each of said adjusting means comprising:
   an internally threaded member formed in the support member;
   a threaded rod having a thread portion which is screwed in said internally threaded member, a shank and a ball-shaped portion formed at a part of the shank;
   an elastically deformable holder made of synthetic resin having a concave spherical surface which receives the ball-shaped portion of said threaded rod and having formed on the outer surface thereof a pair of slanted recesses;
   a holder support member provided on said lamp unit, comprising a pair of guide members having slanted surfaces within said holder support member for engagement with said pair of slanted recesses of said holder and a pair of stoppers formed on upper ends of said guide members for preventing said holder from being displaced, said holder adapted to be fitted on said holder support member from a direction perpendicular to the threaded rod with the recesses being guided by the stoppers, causing the holder to be elastically deformed to locate against said slanted surfaces and then to be engaged with said stoppers by the aid of this elastic deformation; wherein said holder comprises a pair of holder elements having hemispheric concavities, respectively, each hemispheric concavity being part of a channel formed in each of said holder elements which receives the ball-shaped portion of said threaded rod when closed toward each other, and wherein said channels move diametrically apart from each other on respective sides of the ball-shaped portion when the ball-shaped portion is received in said hemispheric concavities.

2. An optical-axis adjusting apparatus according to claim 1, wherein said holder support means is formed integrally with said lamp unit.

3. An optical-axis adjusting apparatus according to claim 1, wherein said threaded rod has a recess formed at an end of said shank which passes through said holder so that said rod is adjustable from the front of said lamp unit.

4. An optical-axis adjusting apparatus according to claim 1, wherein the ball-shaped portion of said threaded rod is held in said hemispheric concavities when said holder elements are fitted into said holder support members.

5. An optical-axis adjusting apparatus according to claim 1, wherein said pair of holder elements each has flanges extending from the opposite sides of said recesses in a direction substantially perpendicular to the moving direction of said threaded rod and of which the inner walls engage on said guide members.

6. An optical-axis adjusting apparatus according to claim 1, wherein said stoppers protrude inwardly, extending in the direction of said threaded rod and engaged with tops of said holder elements.

7. An optical-axis adjusting apparatus for use with a lamp unit including means of adjusting the position of the lamp unit by tilting the lamp unit around the horizontal and vertical axes, respectively, in relation to a support member fixed to the body of a motor vehicle, each of said adjusting means comprising:
   an internally threaded member formed in the support member;
   a threaded rod having a thread portion which is screwed in said internally threaded member, a shank and a ball-shaped portion formed at a part of the shank;
   a synthetic resin-made holder having a concave spherical surface which receives the ball-shaped portion of said threaded rod, said holder comprising a pair of holder elements having hemispheric concavities, respectively, which receive the ball-shaped portion of said threaded rod when closed toward each other; and a holder support member provided on said lamp unit and which fixedly supports said holder, said holder adapted to be fitted on said holder support member from a direction perpendicular to the threaded rod and said holder having formed on the outer surface thereof a pair of recesses slanted in said fitting direction and said holder support member comprising a pair of guide members having slanted engagement surfaces corresponding to said recesses, respectively, said pair of holder elements each having flanges extending from the opposite sides of said recesses in a direction substantially perpendicular to the moving direction of said threaded rod and of which the inner walls engage on said guide members and a stopper for preventing said holder from being displaced in a direction opposite to said fitting direction.

8. An optical-axis adjusting apparatus according to claim 7, wherein said holder elements are joined together by means of a U-shaped coupling member.

* * * * *